S. O. THORELL.
COMBINED STEERING WHEEL AND LOCK FOR MOTOR VEHICLES.
APPLICATION FILED JULY 19, 1916.
1,238,598.
Patented Aug. 28, 1917.
3 SHEETS—SHEET 1.
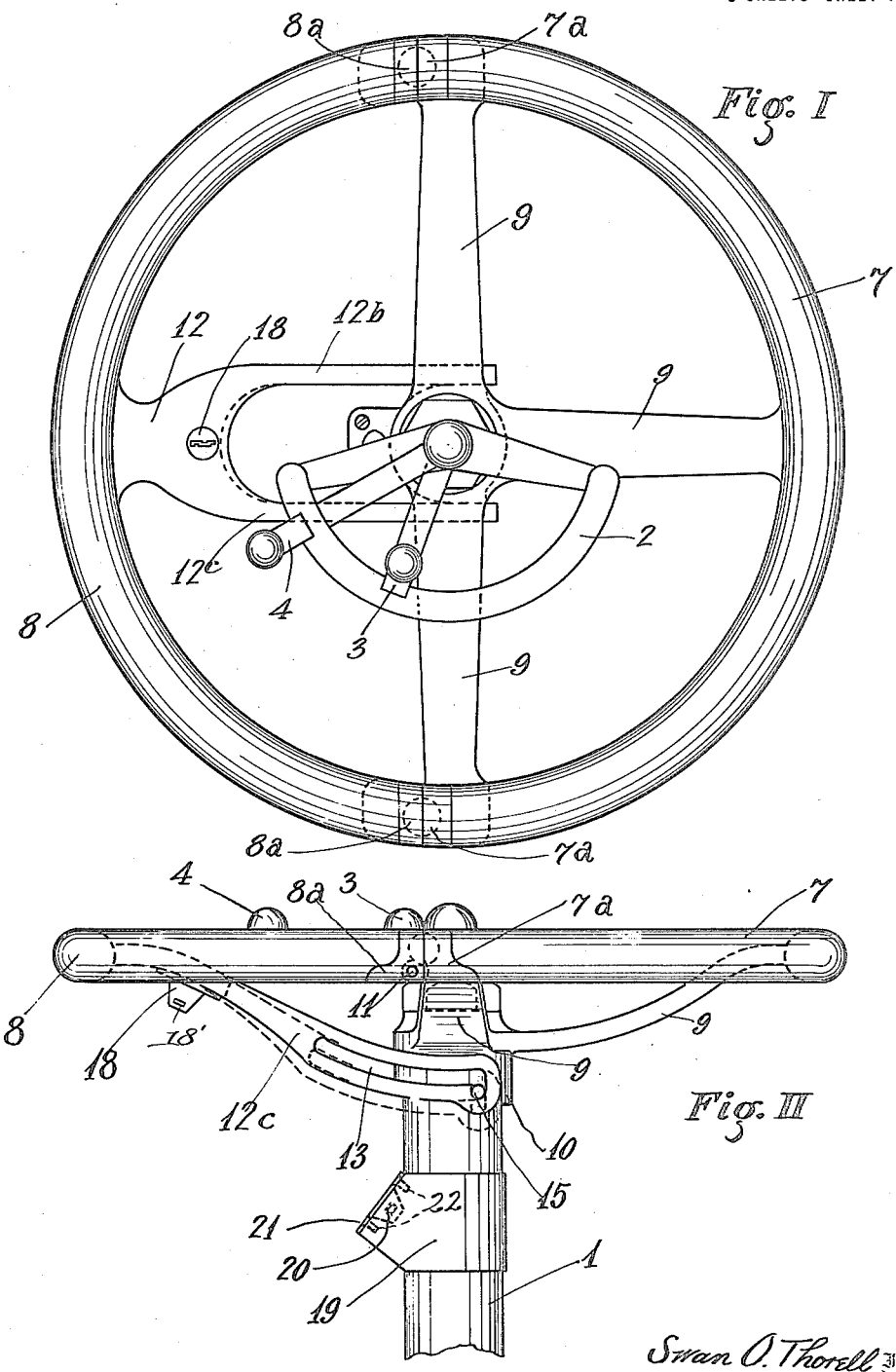

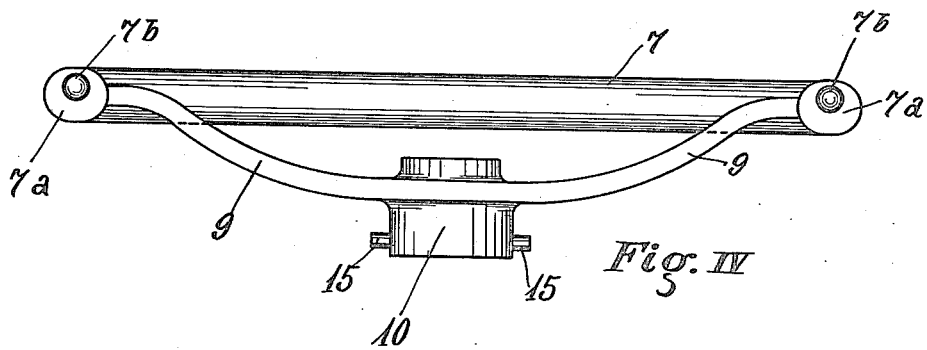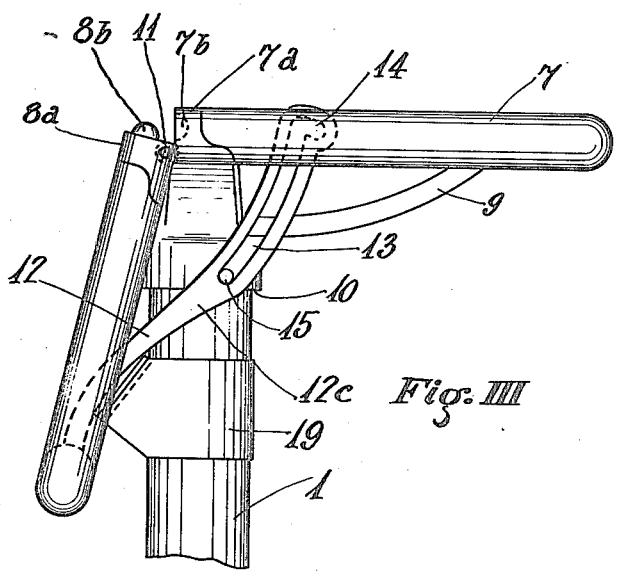

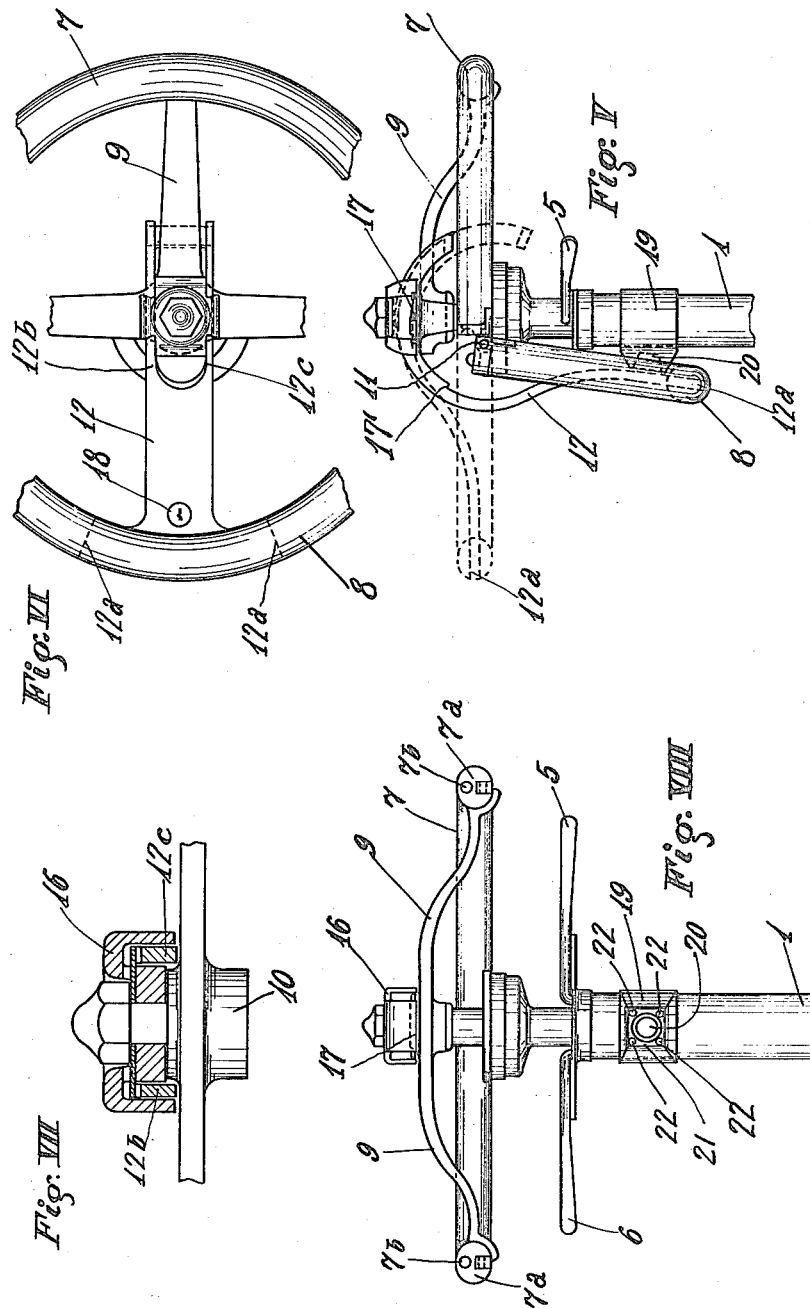

UNITED STATES PATENT OFFICE.

SWAN O. THORELL, OF DENVER, COLORADO.

COMBINED STEERING-WHEEL AND LOCK FOR MOTOR-VEHICLES.

1,238,598.

Specification of Letters Patent.　　Patented Aug. 28, 1917.

Application filed July 19, 1916.　Serial No. 110,182.

*To all whom it may concern:*

Be it known that I, SWAN O. THORELL, a citizen of the United States, residing at Denver, in the county of Denver and State of Colorado, have invented certain new and useful Improvements in Combined Steering-Wheels and Locks for Motor-Vehicles; and I do hereby declare the following to be a full, clear, and exact description of the invention, such as will enable others skilled in the art to which it appertains to make and use the same.

This invention relates to steering wheels for motor vehicles, and has for an object to provide a steering wheel of improved construction for permitting a portion thereof to drop out of normal position.

A further object is to provide improved means for locking the dropped point in the steering wheel to some stationary portion of the vehicle.

With these and other objects in view the invention comprises certain novel constructions, combinations and arrangements of parts as will be hereinafter more fully described and claimed and as illustrated in the accompanying drawings in which like characters of reference indicate corresponding parts throughout the several views and in which Figure I is a plan, showing in normal position a steering wheel constructed in accordance with my invention but otherwise of conventional design.

Fig. II is a side elevation of Fig. I and showing the steering column and the locking device.

Fig. III is a side elevation showing the portion of the steering wheel dropped to locking position.

Fig. IV is a detail of a portion of the steering wheel and of its mounting, constructed in accordance with this invention.

Fig. V is a side elevation of a steering wheel and column in which the accompanying levers for spark, etc., are positioned beneath the wheel and showing a variation in construction of my invention to accord with such changed position of levers and showing wheel in locked position but also showing normal position of wheel and accompanying parts in dotted lines.

Fig. VI is a fragmentary plan of the wheel shown in Fig. V.

Fig. VII is an enlarged cross section of the mounting of the wheel and associated parts.

Fig. VIII is a front elevation of the wheel and other parts shown in Fig. V except the drop portion of the wheel and its spring brace which are omitted from this figure.

The steering column 1 is in no way changed in the construction of my invention. The segment 2 and the levers 3, 4, 5 and 6 are unaltered by my invention. All of the parts above named are of any ordinary or suitable construction now in common use and are shown here simply for illustration and to more clearly illustrate the position and operation of the parts included within my invention.

In constructing my invention I provide a steering wheel whose rim is made in two sections 7 and 8, section 7 being rigidly supported by arms 9, preferably formed integral with the collar 10, which collar 10 is revolubly mounted on the steering column but rigidly attached to the steering shaft within the column, all in the usual and well known manner, said construction being immaterial so far as the present invention is concerned, so long as the portion 7 of the wheel is mounted revolubly but otherwise rigidly upon the steering column 1.

Portion 8 of the steering wheel is provided with a hinged connection with portion 7 as at 11, and in order that the hinge and other connecting parts of the portions 7 and 8 may be more substantial and better and more substantial connection made, the ends of the portions 7 and 8 are provided with metal caps 7$^a$ and 8$^a$ and the parts of the aforesaid hinge 11 may be formed integral with these caps, the exact construction of the hinge being immaterial. The cap 7$^a$ is provided with a depression 7$^b$ and the cap 8$^a$ is provided with a corresponding projection 8$^b$ for fitting within the depression 7$^b$ when the portion 8 of the wheel is raised to normal position, the fit of the projection within the depression aiding in stiffening the joints.

For retaining portion 8 of the wheel in normal position I provide a spring member 12 substantially embedded in or attached to the rim of portion 8 in any suitable manner as indicated by dotted lines at Figs. V and VI at points marked 12$^a$. The member 12 is preferably bifurcated as clearly indicated in Figs. I and VI for engaging suitable guide means and catches as hereinafter described. The arms will be designated as 12ᵇ and 12ᶜ. In order to automatically catch portion 8 when it is raised to normal position and retain it in such position, I provide a suitable catch or lug or projection on the steering column or one of its associated parts and so position and construct the member 12 that the spring pressure will always be against said lugs or projections and then in the spring member 12 or in the arms thereof I provide a set-off which will engage the said lug or projections when the portion 8 of the wheel has reached normal position. For example, where the levers are above the steering wheel as in the embodiment shown in the first four figures, I construct the member 12 in substantially the form shown in Figs. II and III, providing in the arms 12ᵇ and 12ᶜ a slot 13 with a set-off 14 therein and on the clollar 10 I provide lug 15 adapted to lie within the slot 13. The member 12 is positioned and constructed so that spring pressure will always be upward upon the lug 15 so that while the portion 8 of the steering wheel is being raised to normal position, the lug will hold member 12 down to the dotted line position shown in Fig. II but as soon as portion 8 of the steering wheel has been fully raised to normal position, the set-off 14 of the slot 13 will have reached the lug 15 and member 12 will spring upward to solid line position shown in Fig. II so that the lug 15 will be positioned within the set-off 14 and the side of the set-off 14 will rest against the lug 15 and portion 8 of the steering wheel will thus be held in normal position. When it is desired to release portion 8 of the steering wheel and drop it to the position shown in Fig. III, spring member 12 is pressed down to the dotted line position in Fig. II, manually so that lug 15 is disengaged from set-off 14 and as portion 8 is dropped, the lug lying within the slot 13, offers no resistance and portion 8 may be dropped to the position shown in Fig. III.

Where the levers are beneath the steering wheel as in Figs. V, VI, VII and VIII the arms of the spring member 12 are preferably curved upward and then downward as clearly shown at Fig. V and are preferably passed under and within the sides of cap 16 and above pin 17 extending through the top of the steering rod as clearly shown at Fig. VIII. In this case the spring arms are designed to always press downward upon the pin 17 and these arms are provided with an off-set 17' at such a point that it will engage pin 17 when the portion 8 of the steering wheel is raised to normal position. At this point the downward pressure of the spring arms will cause the off-set portion to engage pin 17 and thus hold the portion 8 of the steering wheel in normal position until the spring arms are raised manually to release the off-set from engagement with the pin 17 when portion 8 of the steering wheel may again be dropped to position shown in Fig. V. The normal position of portion 8 of the steering wheel and the spring arms is shown in dotted lines in Fig. V.

On the rim of the steering wheel or upon one of its associated parts, and preferably upon the spring member 12, I provide a lock 18 of any suitable construction shown as mounted in the tiltable section of the hand wheel and having below the latter a tongue or bolt portion 18' shown in Fig. 2 at one side of the lower end of the lock structure 18. I also provide, suitably attached to the steering column 1 as by a band 19, a socket 20 for the lock 18, said band 19 and socket 20 being so positioned that when a point in the steering wheel is dropped to position shown in Figs. III and V, the lock bolt 18' will engage the socket 20 and lock therein. The base of the socket is clearly shown in Fig. VIII and it will be noted that a base plate 21 is provided and that screws 22 or other suitable fastening means secure the base plate 21 to the ends of the band 19, which band may be thickened at its end for this purpose, or any suitable means may be provided whereby the base plate 21 and fastening means 22 shall cover and securely connect the ends of the band 19.

It will be apparent that when portion 8 of the driving wheel is dropped to the positions shown in Figs. III and V, the spring member 12 will entirely cover the base plate 21 and will thus cover and protect the fastening means 22 from molestation so that whenever the lock 18 is within the socket 20 the fastening means 22 of the band 19 cannot be reached except by destroying the spring member 12. It will be evident that the exact construction of band 19, socket 20 and base plate 21 and the fastening means 22 is immaterial so long as the means which secure the ends of the band 19 are sufficiently hidden and protected by the spring member 12 when the lock 18 is within the socket 20. It will also be understood that the lock and socket are shown conventionally only and that any suitable lock and socket may be used. It will also be understood that while a keyhole or slot is shown in Figs. I and VI, any suitable form of lock whether having a key or combination or other equivalent device, may be used.

It will be noted that caps 7ᵃ and 8ᵃ are shown as being flush with the rim of the steering wheel, the intention being to cut away the wood and set the cap on the wood thus cut away so that it will be flush with the steering wheel and form a continuously smooth surface on the rim thereof.

It will also be understood that the details of construction of the spring member 12 and its parts and of the parts associated therewith, may be changed in many ways without departing from the spirit of this invention which is that means shall be provided for automatically catching and holding the movable portion of the steering wheel in normal position, such means being so constructed that they may be quickly and easily released manually.

I claim:

1. A steering wheel, for motor vehicles, constructed in two parts, one of which parts is mounted in engagement with the steering shaft, the other of which is so hingedly mounted upon said first part that it is normally in alinement therewith but may be dropped out of alinement, and manually disconnectible means for normally holding said second part in said normal position.

2. A steering wheel, for motor vehicles, constructed in two parts, one of which parts is mounted in engagement with the steering shaft, the other of which is so hingedly mounted upon said first part that it is normally in alinement therewith but may be dropped out of alinement and means for automatically catching and holding said second part in normal position when raised thereto.

3. A steering wheel, for motor vehicles, constructed in two parts, one of which parts is mounted in engagement with the steering shaft, the other of which is so hingedly mounted upon said first part that it is normally in alinement therewith but may be dropped out of alinement and means for automatically catching and holding said second part in normal position when raised thereto, said holding means being manually disconnectible.

4. A steering wheel, for motor vehicles, constructed in two parts, one of which parts is mounted in engagement with the steering shaft, the other of which is so hingedly mounted upon said first part that it is normally in alinement therewith but may be dropped out of alinement and spring means for automatically catching and holding said second part in normal position when raised thereto, said holding means being manually disconnectible.

5. The combination of a two part steering wheel having one part mounted in engagement with the steering shaft and the second part so hingedly mounted upon the first part as to permit its rim to drop to a position adjacent the steering column with means for locking said second part of the wheel to the steering column.

6. The combination of a two part steering wheel having one part mounted in engagement with the steering shaft and the second part so hingedly mounted upon the first part as to permit its rim to drop to a position adjacent the steering column with locking means having one part fixedly mounted upon the steering column and the co-acting part of said lock mounted upon said second part of the wheel.

7. In a steering wheel for motor vehicles, means for holding the entire rim in normal position or for dropping it at one point at will, and means for locking it to the steering column when dropped.

8. In a steering wheel for motor vehicles, the combination with means for supporting one side of the rim from the steering column, and means for supporting the other side or dropping it at will; of means for locking it to said column when dropped.

9. In a steering wheel for motor vehicles, the combination with means for supporting one side of the rim from the steering column, and means for supporting the other side or dropping it at will; of means for locking it to said column when dropped, and means for catching and holding it when raised.

10. In a steering wheel, the combination with the steering column and shaft, a collar fast on said shaft, and an arm projecting from said collar; of a wheel rim supported at one point by said arm, means for holding the entire rim in normal position at will or for dropping it at a point opposite said support, and a lock including coacting elements on the column and on the rim at the point dropped.

11. In a steering wheel, the combination with the steering column and shaft; of the wheel rim, means for catching and holding it in normal position or for dropping it at will, and means for locking it to said column when dropped.

12. In a steering wheel for motor vehicles, means for holding the rim in normal position or for dropping it at will, and means for locking it to the steering column when dropped.

In testimony whereof I affix my signature.

SWAN O. THORELL.